US010525538B2

(12) United States Patent
Matsuda et al.

(10) Patent No.: US 10,525,538 B2
(45) Date of Patent: Jan. 7, 2020

(54) CUTTING TOOL

(71) Applicants: SUMITOMO ELECTRIC HARDMETAL CORP., Itami-shi (JP); Sumitomo Electric Industries, Ltd., Osaka-shi (JP)

(72) Inventors: Yusuke Matsuda, Itami (JP); Taisuke Higashi, Itami (JP); Satoru Kukino, Itami (JP); Takashi Kanda, Osaka (JP)

(73) Assignees: Sumitomo Electric Hardmetal Corp., Itami-shi (JP); Sumitomo Electric Industries, Ltd., Osaka-shi (JP)

( * ) Notice: Subject to any disclaimer, the term of this patent is extended or adjusted under 35 U.S.C. 154(b) by 8 days.

(21) Appl. No.: 16/065,223

(22) PCT Filed: Nov. 15, 2016

(86) PCT No.: PCT/JP2016/083799
§ 371 (c)(1),
(2) Date: Jun. 22, 2018

(87) PCT Pub. No.: WO2018/092184
PCT Pub. Date: May 24, 2018

(65) Prior Publication Data
US 2019/0001423 A1  Jan. 3, 2019

(51) Int. Cl.
*B23C 5/10* (2006.01)
(52) U.S. Cl.
CPC .......... *B23C 5/10* (2013.01); *B23C 2210/045* (2013.01); *B23C 2210/0485* (2013.01);
(Continued)

(58) Field of Classification Search
CPC .......... B23F 21/12; B23F 21/16; B23F 21/24; B23C 5/00; B23C 5/10; B23C 5/28;
(Continued)

(56) References Cited

U.S. PATENT DOCUMENTS 1,916,259 A * 7/1933 Ewert ...................... B23F 21/16
407/23
3,058,199 A * 10/1962 Cave ......................... B23C 5/10
407/54
(Continued)

FOREIGN PATENT DOCUMENTS

JP  63-093511 A   4/1988
JP  04-372306 A   12/1992
(Continued)

*Primary Examiner* — Willmon Fridie, Jr.
(74) *Attorney, Agent, or Firm* — Baker Botts L.L.P.; Michael A. Sartori

(57) ABSTRACT

A cutting tool includes a shaft portion and a plurality of edge region groups. The ridgeline between the first rake face portion and the first flank face portion constitutes a first cutting edge portion. The ridgeline between the second rake face portion and the second flank face portion constitutes a second cutting edge portion. As seen from the direction perpendicular to a plane tangent to the outer peripheral surface, in a state where the central axis overlaps a first end on the front end side of the first cutting edge portion, the inclination angle of the first cutting edge portion relative to the central axis is larger than the inclination angle of a straight line relative to the central axis, the straight line connecting the first end to a second end on the front end side of the second cutting edge portion.

6 Claims, 9 Drawing Sheets

(52) U.S. Cl.
CPC .. *B23C 2210/088* (2013.01); *B23C 2210/323* (2013.01); *B23C 2222/64* (2013.01); *B23C 2226/125* (2013.01); *B23C 2226/315* (2013.01)

(58) Field of Classification Search
CPC ...... B23C 2210/045; B23C 2210/0485; B23C 2210/088; B23C 2210/323
See application file for complete search history.

(56) References Cited

U.S. PATENT DOCUMENTS

| | | | | |
|---|---|---|---|---|
| 4,990,035 | A * | 2/1991 | Scheuch | B23C 5/10 407/29.13 |
| 5,626,444 | A * | 5/1997 | Campian | B23C 3/00 407/54 |
| 9,174,287 | B2 * | 11/2015 | Shpigelman | B23C 5/10 |
| 2005/0123363 | A1 * | 6/2005 | Ahrnkiel | B23C 5/10 407/53 |
| 2012/0020749 | A1 | 1/2012 | Maeda et al. | |
| 2017/0216936 | A1 * | 8/2017 | Dodds | B23C 5/10 |
| 2017/0252843 | A1 * | 9/2017 | Matsubara | B23F 21/12 |
| 2017/0266739 | A1 * | 9/2017 | Yamasaki | B23C 5/10 |
| 2018/0326520 | A1 * | 11/2018 | Monden | B23F 21/10 |

FOREIGN PATENT DOCUMENTS

| | | |
|---|---|---|
| JP | 2010-240818 A | 10/2010 |
| JP | 2011-020248 A | 2/2011 |
| JP | 2012-206197 A | 10/2012 |
| WO | 2010/137429 A1 | 12/2010 |

* cited by examiner

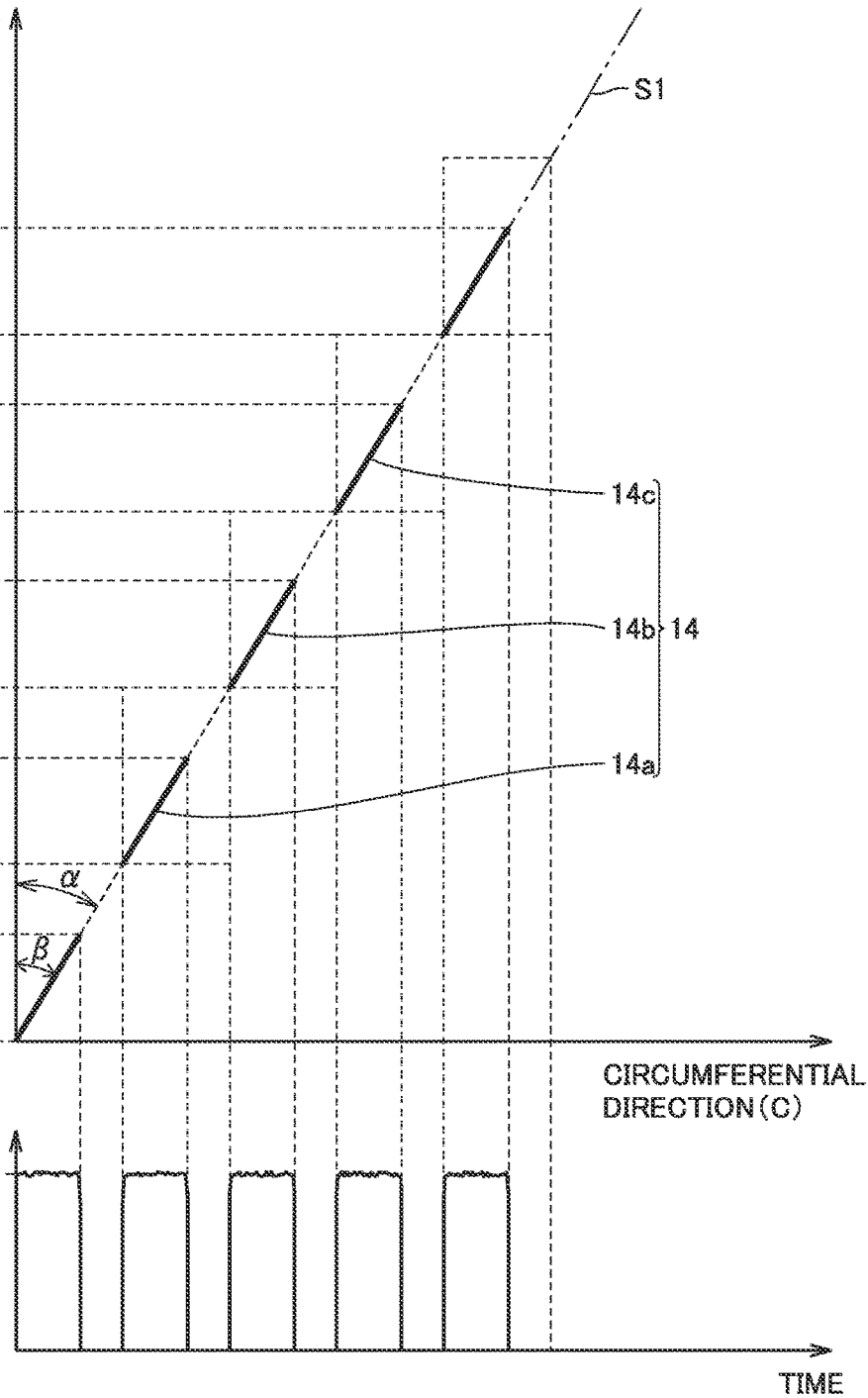

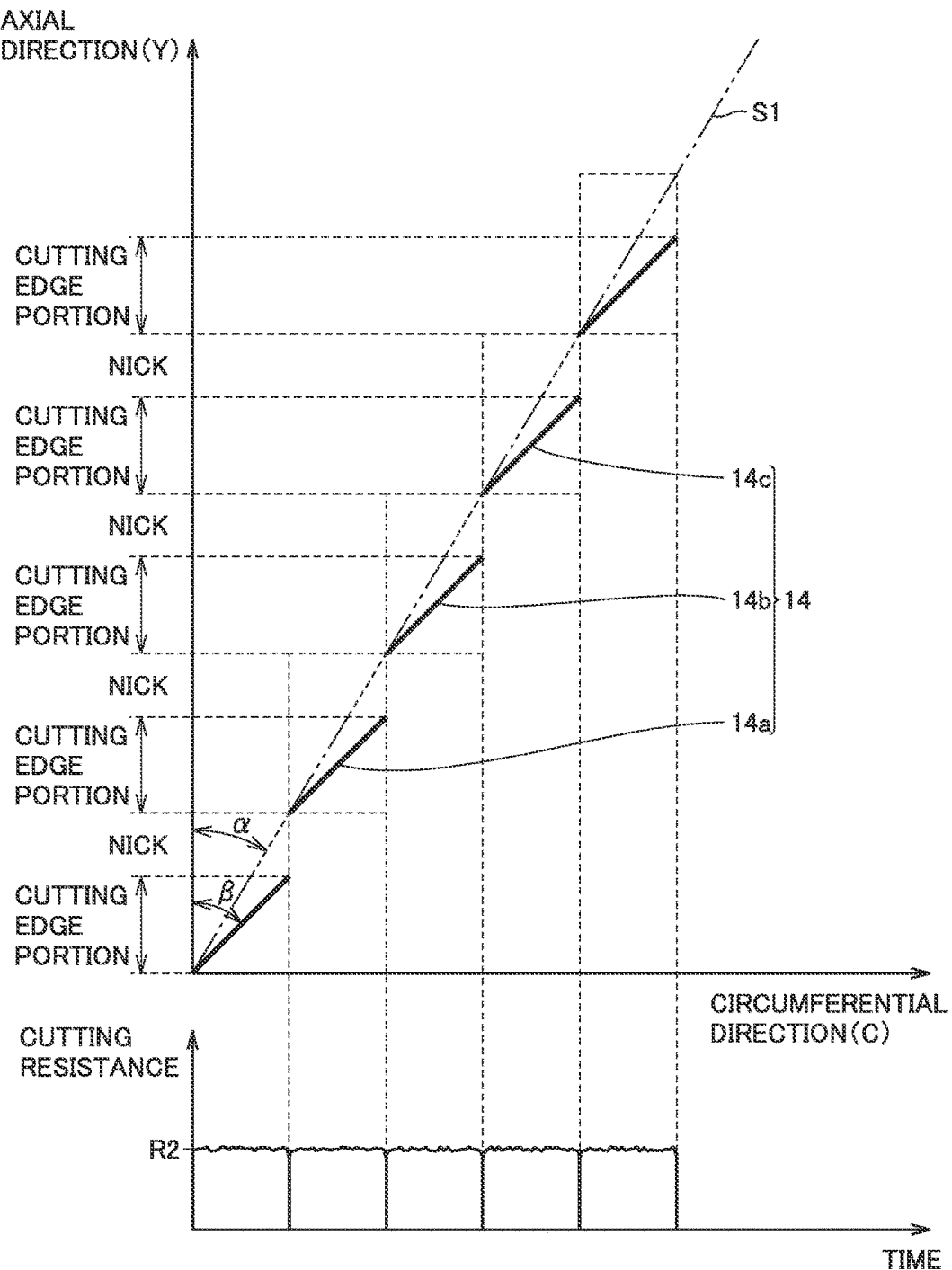

CUTTING TOOL

TECHNICAL FIELD

The present invention relates to a cutting tool.

BACKGROUND ART

An endmill, for example, has been used for cutting of materials that are generally taken as difficult-to-cut materials, such as nickel-base heat-resistant alloys. For end milling of difficult-to-cut materials, a cutting tool with a cutting edge having split portions called nicks has been proposed (for example, PTDs 1-3). By providing nicks in a cutting edge to make the cutting edge discontinuous, swarf is split to reduce cutting resistance and reduce temperature rise of the cutting edge.

CITATION LIST

Patent Document

PTD 1: Japanese Patent Laying-Open No. 2012-206197
PTD 2: Japanese Patent Laying-Open No. 2010-240818
PTD 3: WO 2010/137429

SUMMARY OF INVENTION

A cutting tool according to one aspect of the present invention includes a shaft portion and a plurality of edge region groups. The shaft portion extends along the central axis and includes an outer peripheral surface surrounding the central axis. The plurality of edge region groups are spirally provided on the outer peripheral surface. The plurality of edge region groups include a first edge region group divided by a first nick. The first edge region group includes a first edge region and a second edge region that is adjacent to the first edge region, with the first nick lying between the first edge region and the second edge region. The first edge region includes a first rake face portion and a first flank face portion that is continuous with the first rake face portion. The ridgeline between the first rake face portion and the first flank face portion constitutes a first cutting edge portion. The second edge region includes a second rake face portion and a second flank face portion that is continuous with the second rake face portion. The ridgeline between the second rake face portion and the second flank face portion constitutes a second cutting edge portion. As seen from the direction perpendicular to a plane tangent to the outer peripheral surface, in a state where the central axis overlaps a first end on the front end side of the first cutting edge portion, the inclination angle of the first cutting edge portion relative to the central axis is larger than the inclination angle of a straight line relative to the central axis, the straight line connecting the first end to a second end on the front end side of the second cutting edge portion.

BRIEF DESCRIPTION OF DRAWINGS

FIG. 8 shows the relationship between cutting resistance and time of a cutting tool in a comparative example.
FIG. 9 shows the relationship between cutting resistance and time of a cutting tool in the Examples.

EMBODIMENTS TO CARRY OUT INVENTION

Figure 1:
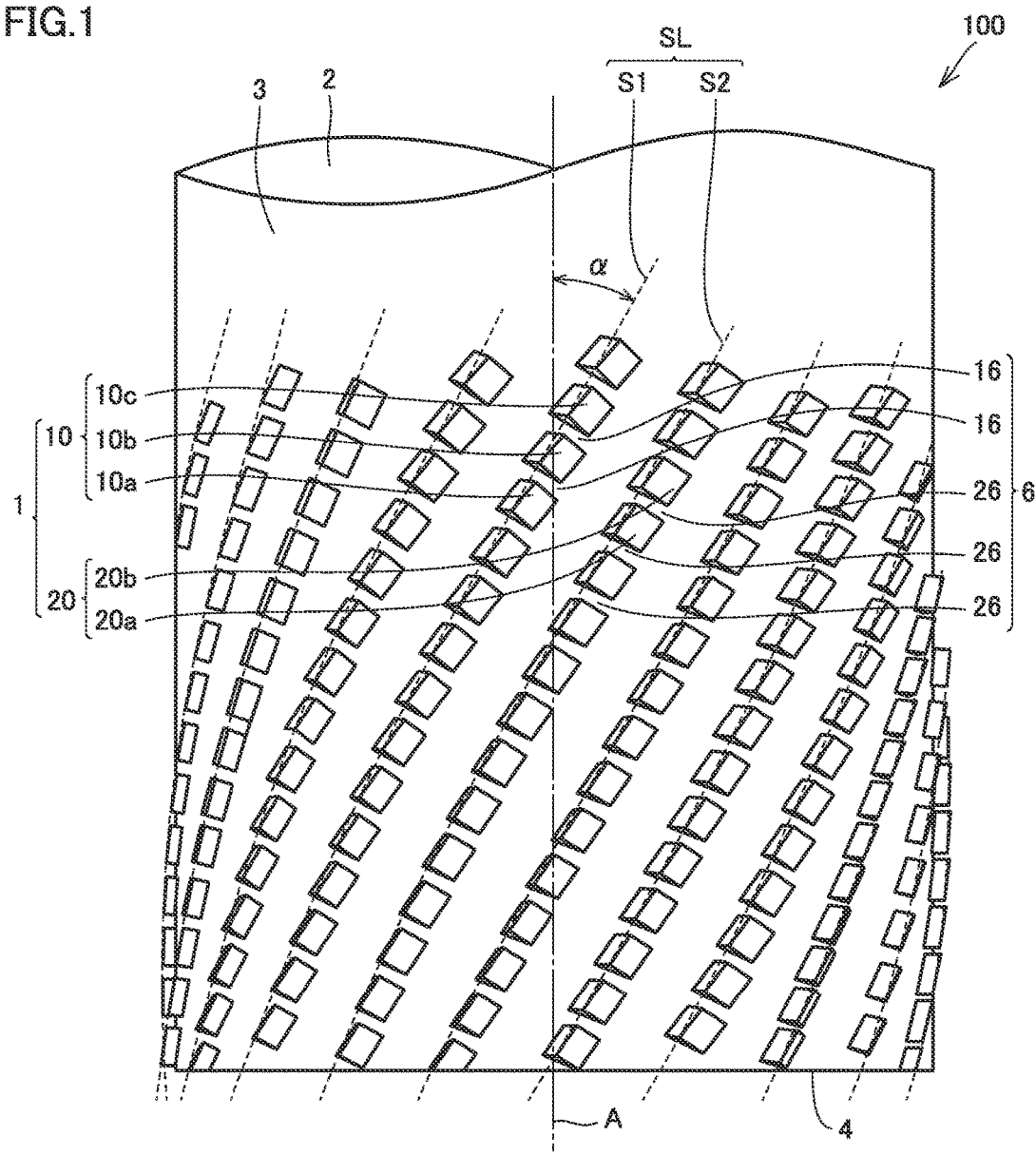
FIG. 1 is a front schematic view showing a configuration of a cutting tool in a first embodiment.

[Problem to be Solved by the Present Disclosure]

In cutting tools disclosed in PTDs 1-3, the array direction of a plurality of cutting edge portions is the same as the direction in which the cutting edge portions extend, and the cutting edge portions and nicks are alternately disposed in the circumferential direction. Accordingly, at a time of cutting work, the cutting edge portions intermittently hit a workpiece, thus possibly causing great impulsive vibrations, such as chattering vibrations. Therefore, it is difficult to prolong the cutting tool life. Also, it is difficult to sufficiently reduce the cutting resistance.

An object of one aspect of the present invention is to provide a cutting tool having a reduced cutting resistance and a prolonged life.

[Advantageous Effect of the Present Disclosure]

According to one aspect of the present invention, a cutting tool having a reduced cutting resistance and a prolonged life can be provided.

[Summary of Embodiments of the Present Disclosure]

First of all, the summary of embodiments of the present disclosure are described.

(1) A cutting tool 100 according to one aspect of the present invention includes a shaft portion 2 and a plurality of edge region groups 1. Shaft portion 2 extends along central axis A and includes an outer peripheral surface 3 surrounding central axis A. The plurality of edge region groups 1 are spirally provided on outer peripheral surface 3. The plurality of edge region groups 1 include a first edge region group 10 divided by a first nick 16. First edge region group 10 includes a first edge region 10b and a second edge region 10a that is adjacent to first edge region 10b, with first nick 16 lying between first edge region 10b and second edge region 10a. First edge region 10b includes a first rake face portion 11b and a first flank face portion 12b that is continuous with first rake face portion 11b. The ridgeline between first rake face portion 11b and first flank face portion 12b constitutes a first cutting edge portion 14b. Second edge region 10a includes a second rake face portion 11a and a second flank face portion 12a that is continuous with second rake face portion 11a. The ridgeline between second rake face portion 11a and second flank face portion 12a constitutes a second cutting edge portion 14a. As seen from the direction perpendicular to a plane tangent to outer peripheral surface 3, in a state where central axis A overlaps a first end 15b on the front end side of first cutting edge portion 14b, an inclination angle $\beta$ of first cutting edge portion 14b relative to central axis A is larger than an inclination angle $\alpha$ of a straight line SL relative to central axis A, the straight line SL connecting first end 15b to a second end 15a on the front end side of second cutting edge portion 14a.

In cutting tool 100 according to the above (1), inclination angle β of first cutting edge portion 14b relative to central axis A is larger than inclination angle α of straight line SL relative to central axis A, the straight line SL connecting first end 15b to second end 15a on the front end side of second cutting edge portion 14a. Accordingly, first cutting edge portion 14b has a larger rake angle in the case where inclination angle β of first cutting edge portion 14b relative to central axis A is larger than inclination angle α of the straight line SL relative to central axis A, than in the case where inclination angle β of first cutting edge portion 14b relative to central axis A is the same as inclination angle α of the straight line SL relative to central axis A. As a result, the cutting resistance of first cutting edge portion 14b can be reduced. Further, the distance between first cutting edge portion 14b and second cutting edge portion 14a in the circumferential direction is smaller in the case where inclination angle β of first cutting edge portion 14b relative to central axis A is larger than inclination angle α of the straight line relative to central axis A, than in the case where inclination angle β of first cutting edge portion 14b relative to central axis A is the same as inclination angle α of the straight line relative to central axis A. Accordingly, at a time of cutting work, intermittent contact of first and second cutting edge portions 14b and 14a with a workpiece can be prevented. As a result, impulsive vibrations, such as chattering vibrations, can be reduced and the life of cutting tool 100 can be prolonged.

(2) In cutting tool 100 according to the above (1), the plurality of edge region groups 1 may include a second edge region group 20 divided by a second nick 26. Second edge region group 20 may include a third edge region 20b and a fourth edge region 20a that is adjacent to third edge region 20b, with second nick 26 lying between third edge region 20b and fourth edge region 20a. Third edge region 20b may include a third rake face portion 21b and a third flank face portion 22b that is continuous with third rake face portion 21b. The ridgeline between third rake face portion 21b and third flank face portion 22b may constitute a third cutting edge portion 24b. Fourth edge region 20a may include a fourth rake face portion 21a and a fourth flank face portion 22a that is continuous with fourth rake face portion 21a. The ridgeline between fourth rake face portion 21a and fourth flank face portion 22a may constitute a fourth cutting edge portion 24a. In the circumferential direction of outer peripheral surface 3, first cutting edge portion 14b may be disposed so as to overlap second nick 26, and fourth cutting edge portion 24a may be disposed so as to overlap first nick 16. Thus, the cutting edge portions can lie in all positions in the axial direction.

(3) In cutting tool 100 according to the above (1) or (2), second cutting edge portion 14a may include a third end 17a on the side opposite to second end 15a. First cutting edge portion 14b and second cutting edge portion 14a may overlap each other in the circumferential direction of outer peripheral surface 3. As seen from the direction perpendicular to a plane tangent to outer peripheral surface 3, the distance W2 between first end 15b and third end 17a in the circumferential direction may be 0.3 times or less the distance W1 between first end 15b and second end 15a in the circumferential direction. Thus, the cutting resistance can be reduced.

(4) In cutting tool 100 according to the above (3), as seen from the direction perpendicular to a plane tangent to outer peripheral surface 3, the distance W2 between first end 15b and third end 17a in the circumferential direction may be 0.05 times or less the distance W1 between first end 15b and second end 15a in the circumferential direction. Thus, the cutting resistance can be further reduced.

(5) In cutting tool 100 according to the above (1) or (2), second cutting edge portion 14a may include a third end 17a on the side opposite to second end 15a. First cutting edge portion 14b and second cutting edge portion 14a may be separated from each other in the circumferential direction of outer peripheral surface 3. As seen from the direction perpendicular to a plane tangent to outer peripheral surface 3, the distance W3 between first end 15b and third end 17a in the circumferential direction may be 0.1 times or less the distance W1 between first end 15b and second end 15a in the circumferential direction. Thus, the changes in cutting resistance can be reduced.

(6) In cutting tool 100 according to the above (5), as seen from the direction perpendicular to a plane tangent to outer peripheral surface 3, the distance W3 between first end 15b and third end 17a in the circumferential direction may be 0.05 times or less the distance W1 between first end 15b and second end 15a in the circumferential direction. Thus, the changes in cutting resistance can be further reduced.

(7) In cutting tool 100 according to any one of the above (1) to (6), as seen from the direction perpendicular to a plane tangent to outer peripheral surface 3, in the state where central axis A overlaps first end 15b, inclination angle α of straight line SL relative to central axis A may be greater than or equal to 5° and less than or equal to 45°, and inclination angle β of first cutting edge portion 14b relative to central axis A may be larger than inclination angle α of straight line SL relative to central axis A by greater than or equal to 3° and less than or equal to 15°. Thus, the cutting resistance value can be reduced.

(8) In cutting tool 100 according to any one of the above (1) to (7), the plurality of edge region groups 1 may be composed of at least any of a cemented carbide alloy coated with diamond, a polycrystalline sintered diamond, and a cubic boron nitride. By using a hard material, such as a cemented carbide alloy coated with diamond, a polycrystalline sintered diamond, and a cubic boron nitride as the tool material, the tool has a good abrasion resistance. Therefore, a tool with a further prolonged life can be obtained.

(9) In cutting tool 100 according to any one of the above (1) to (4), as seen from the direction perpendicular to a plane tangent to outer peripheral surface 3, in the state where central axis A overlaps first end 15b, the inclination angle of straight line SL relative to central axis A being α°, and the inclination angle of first cutting edge portion 14b relative to central axis A being β°, the width of first nick 16 in the direction parallel to central axis A may be less than or equal to tan(90−α)−tan(90−β). Thus, occurrence of intermittent impulsive vibrations can be prevented.

[Details of Embodiments of the Present Disclosure]

The details of embodiments of the present disclosure will now be described with reference to the drawings. In the following description, identical or corresponding elements are identically denoted, and the same explanation is not repeated for such elements.

(First Embodiment)

First, a configuration of a cutting tool in a first embodiment is described.

As shown in FIG. 1, a cutting tool 100 in the first embodiment is an endmill to be used for milling, for example. A workpiece material to be cut with cutting tool 100 of the present embodiment is, for example, what is called a difficult-to-cut material. One example of the workpiece material is a nickel-base alloy. Cutting tool 100 mainly includes a shaft portion 2 and a plurality of edge region groups 1. Shaft portion 2 is, for example, substantially cylindrical in shape and extends along central axis A. Shaft portion 2 has an outer peripheral surface 3 surrounding central axis A. Outer peripheral surface 3 is, for example, a cylindrical surface. Shaft portion 2 has a front end 4 and a rear end on the side opposite to front end 4. The rear end is, for example, a portion that constitutes a shank. Front end 4 is a portion to face a workpiece at a time of cutting work. Front end 4 is, for example, the bottom face of the endmill.

A plurality of edge region groups 1 are spirally provided on outer peripheral surface 3 of shaft portion 2. A plurality of edge region groups 1 are separated from one another. A plurality of edge region groups 1 extend spirally around central axis A. The number of the edge region groups may be any number greater than or equal to 2. For example, the number may be 4 or more, 6 or more, or 8 or more. A plurality of edge region groups 1 include a first edge region group 10 and a second edge region group 20, for example. First edge region group 10 is divided by first nicks 16. First edge region group 10 and first nicks 16 are located on a first spiral lead line S1. Second edge region group 20 is divided by second nicks 26. Second edge region group 20 and second nicks 26 are located on a second spiral lead line S2. First spiral lead line S1 and second spiral lead line S2 are separated from each other so that they do not cross each other. First spiral lead line S1 and second spiral lead line S2 may be different from each other in helix angle (irregular lead design). A plurality of edge regions constituting each edge region group may be different from one another in pitch (irregular pitch design).

Figure 2:
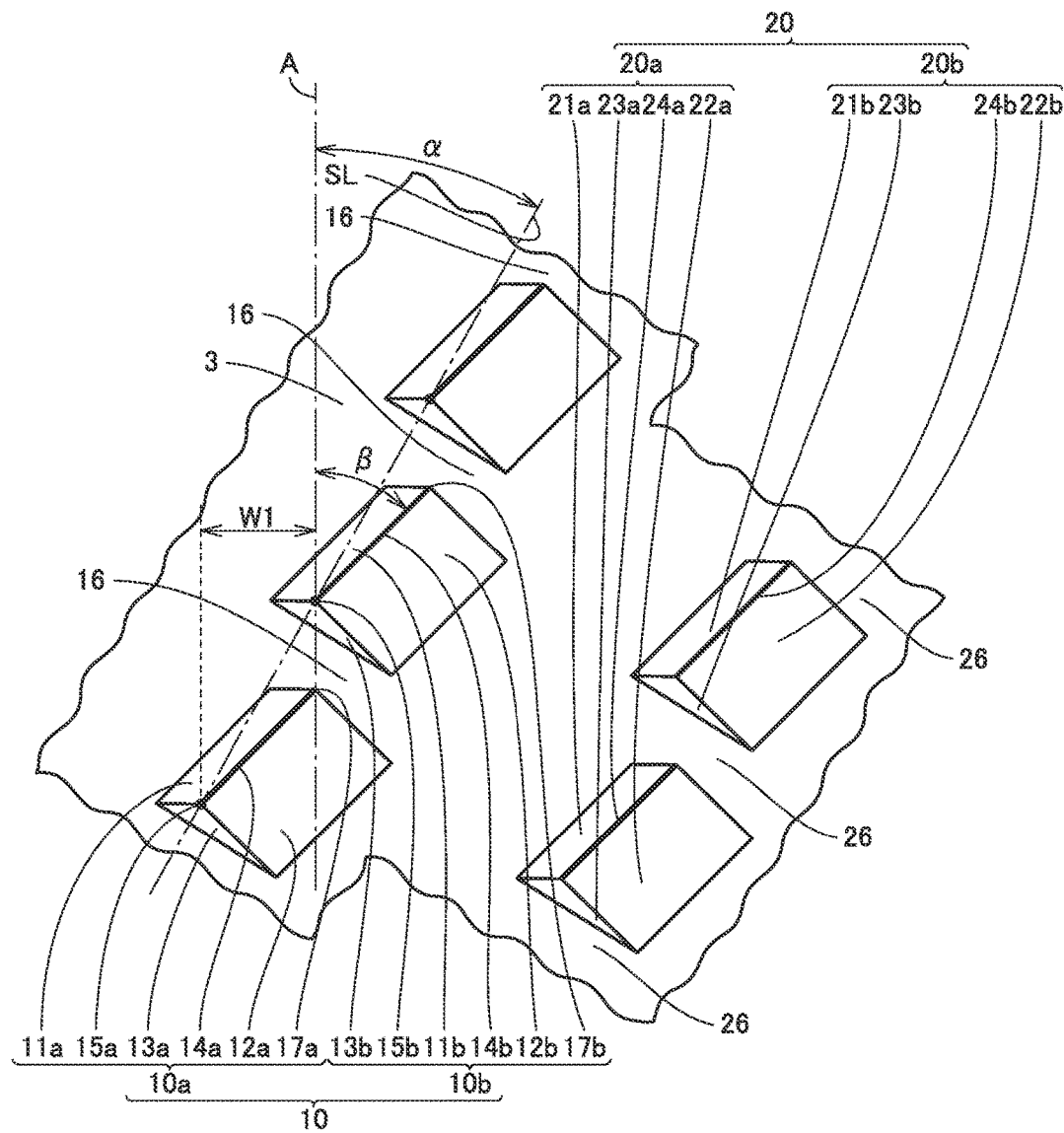
FIG. 2 is an enlarged front schematic view showing a configuration of first to fourth cutting edge portions.

As shown in FIG. 2, first edge region group 10 includes, for example, a first edge region 10b and a second edge region 10a. Second edge region 10a is adjacent to first edge region 10b, with first nick 16 lying therebetween. In other words, first nick 16 is between first edge region 10b and second edge region 10a. First edge region 10b and second edge region 10a are separated from each other by first nick 16. First edge region 10b includes a first rake face portion 11b, a first flank face portion 12b, and a first bottom face portion 13b. First flank face portion 12b is continuous with first rake face portion 11b. First bottom face portion 13b is continuous with both first rake face portion 11b and first flank face portion 12b. The ridgeline between first rake face portion 11b and first flank face portion 12b constitutes a first cutting edge portion 14b. First cutting edge portion 14b includes a first end 15b and a fourth end 17b. First end 15b is located on the front end side of shaft portion 2. First end 15b is a portion where first rake face portion 11b, first flank face portion 12b, and first bottom face portion 13b join one another. Fourth end 17b is located on the side opposite to first end 15b. Fourth end 17b is located on the shank side (rear end side).

Second edge region 10a includes a second rake face portion 11a, a second flank face portion 12a, and a second bottom face portion 13a. Second flank face portion 12a is continuous with second rake face portion 11a. Second bottom face portion 13a is continuous with both second rake face portion 11a and second flank face portion 12a. The ridgeline between second rake face portion 11a and second flank face portion 12a constitutes a second cutting edge portion 14a. Second cutting edge portion 14a includes a second end 15a and a third end 17a. Second end 15a is located on the front end side of shaft portion 2. Second end 15a is a portion where second rake face portion 11a, second flank face portion 12a, and second bottom face portion 13a join one another. Third end 17a is located on the side opposite to second end 15a. Third end 17a is located on the shank side (rear end side).

As shown in FIG. 2, second edge region group 20 includes, for example, a third edge region 20b and a fourth edge region 20a. Fourth edge region 20a is adjacent to third edge region 20b, with second nick 26 lying therebetween. In other words, second nick 26 is between third edge region 20b and fourth edge region 20a. Third edge region 20b and fourth edge region 20a are separated from each other by second nick 26. Third edge region 20b includes a third rake face portion 21b, a third flank face portion 22b, and a third bottom face portion 23b. Third flank face portion 22b is continuous with third rake face portion 21b. Third bottom face portion 23b is continuous with both third rake face portion 21b and third flank face portion 22b. The ridgeline between third rake face portion 21b and third flank face portion 22b constitutes a third cutting edge portion 24b. Similarly, fourth edge region 20a includes a fourth rake face portion 21a, a fourth flank face portion 22a, and a fourth bottom face portion 23a. Fourth flank face portion 22a is continuous with fourth rake face portion 21a. Fourth bottom face portion 23a is continuous with both fourth rake face portion 21a and fourth flank face portion 22a. The ridgeline between fourth rake face portion 21a and fourth flank face portion 22a constitutes a fourth cutting edge portion 24a.

In the circumferential direction, the edge regions in first edge region group 10 may overlap the nicks in second edge region group 20, and the edge regions in second edge region group 20 may overlap the nicks in first edge region group 10. Specifically, in the circumferential direction of outer peripheral surface 3, first cutting edge portion 14b is disposed so as to overlap second nick 26, and fourth cutting edge portion 24a is disposed so as to overlap first nick 16. Similarly, in the circumferential direction of outer peripheral surface 3, second cutting edge portion 14a is disposed so as to overlap second nick 26, and third cutting edge portion 24b is disposed so as to overlap first nick 16.

As seen from the direction perpendicular to a plane tangent to outer peripheral surface 3 (i.e., to a plane showing FIG. 2), in the state where central axis A overlaps first end 15b, inclination angle $\beta$ of first cutting edge portion 14b relative to central axis A is larger than inclination angle $\alpha$ of a straight line SL relative to central axis A, the straight line SL connecting first end 15b and second end 15a to each other. Similarly, in the state where central axis A overlaps second end 15a, the inclination angle of second cutting edge portion 14a relative to central axis A is larger than inclination angle $\alpha$ of straight line SL relative to central axis A, the straight line SL connecting first end 15b and second end 15a to each other. The direction in which straight line SL connecting first end 15b and second end 15a to each other extends is the direction in which first edge region group 10 extends. In other words, the direction in which straight line SL connecting first end 15b and second end 15a to each other extends is the direction in which the ends on the front end side of the cutting edge portions of a plurality of edge regions that constitute first edge region group 10 are arranged.

As seen from the direction perpendicular to a plane tangent to outer peripheral surface 3, in the state where central axis A overlaps first end 15b, inclination angle $\alpha$ of straight line SL relative to central axis A may be greater than or equal to 5° and less than or equal to 45°, and inclination angle $\beta$ of first cutting edge portion 14b relative to central axis A may be larger than inclination angle $\alpha$ of straight line SL relative to central axis A by greater than or equal to 3° and less than or equal to 15°. Similarly, as seen from the direction perpendicular to a plane tangent to outer peripheral surface 3, in the state where central axis A overlaps second end 15a, inclination angle α of straight line SL relative to central axis A may be greater than or equal to 5° and less than or equal to 45°, and inclination angle β of second cutting edge portion 14a relative to central axis A may be larger than inclination angle α of straight line SL relative to central axis A by greater than or equal to 3° and less than or equal to 15°. The inclination angle of first cutting edge portion 14b relative to central axis A may be the same as or different from the inclination angle of second cutting edge portion 14a relative to central axis A. In the case where the inclination angle of first cutting edge portion 14b relative to central axis A is different from the inclination angle of second cutting edge portion 14a relative to central axis A, the inclination angle of first cutting edge portion 14b relative to central axis A may be larger than or may be smaller than the inclination angle of second cutting edge portion 14a relative to central axis A.

A method for measuring inclination angle α and inclination angle β will now be described.

For measuring inclination angle α and inclination angle β, INFINITE FOCUS G5 manufactured by Alicona is used, for example. For example, Laboratory Measurement is used as an imaging software, and Measure Suite is used as an analysis software. Cutting tool 100 is disposed so that cutting tool 100 can be seen from the direction perpendicular to a plane tangent to outer peripheral surface 3. While this state is maintained, the position of cutting tool 100 in the direction of rotation is adjusted in such a way that central axis A of cutting tool 100 overlaps first end 15b of first cutting edge portion 14b. In this state, an image of the front face of cutting tool 100 is taken. By using this image, straight line SL connecting first end 15b of first cutting edge portion 14b to second end 15a of second cutting edge portion 14a is identified. Inclination angle α of the straight line SL relative to central axis A is obtained. Similarly, by using this image, inclination angle β of first cutting edge portion 14b relative to central axis A is obtained. If first end 15b is rounded and the position of first end 15b is difficult to determine, then the intersection of the extension of the ridgeline between first bottom face portion 13b and first rake face portion 11b, and the extension of the ridgeline between first bottom face portion 13b and first flank face portion 12b is determined to be first end 15b. The same applies to second end 15a.

Figure 3:
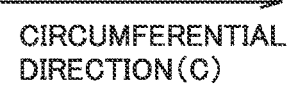
FIG. 3 is a developed schematic view showing the positional relationship of cutting edge portions in an outer peripheral surface developed in a plane, with the vertical axis representing the axial direction and with the horizontal axis representing the circumferential direction.

FIG. 3 is a schematic view showing the positional relationship of the cutting edge portions in the outer peripheral surface developed in a plane, with the vertical axis representing the axial direction and with the horizontal axis representing the circumferential direction. As shown in FIG. 3, each of the ends on the front end side of a plurality of cutting edge portions (first cutting edge portion 14b, second cutting edge portion 14a, and fifth cutting edge portion 14c) is located on first spiral lead line S1. As shown in FIG. 3, inclination angle β of each of a plurality of cutting edge portions relative to the axial direction (central axis A) is larger than inclination angle α of first spiral lead line S1 relative to the axial direction (central axis A). In other words, each of a plurality of cutting edge portions is inclined from first spiral lead line S1 in the circumferential direction. As shown in FIG. 3, in the circumferential direction, with respect to two cutting edge portions adjacent to each other with a nick lying therebetween, the end on the front end side of one cutting edge portion may be the same in position as the end on the rear end side (shank side) of the other cutting edge portion.

If the diameter of cutting tool 100 is sufficiently larger than the length of first cutting edge portion 14b in the circumferential direction, errors are negligible between inclination angles α and β obtained in the state where outer peripheral surface 3 is developed in a plane with the vertical axis representing the axial direction and with the horizontal axis representing the circumferential direction, and inclination angles α and β obtained in the state where cutting tool 100 is seen from the direction perpendicular to a plane tangent to outer peripheral surface 3. Specifically, if the diameter of cutting tool 100 is four times or more the length of first cutting edge portion 14b in the circumferential direction, it can be estimated that inclination angles α and β obtained in the state where outer peripheral surface 3 is developed in a plane with the vertical axis representing the axial direction and with the horizontal axis representing the circumferential direction are substantially the same as inclination angles α and β obtained in the state where cutting tool 100 is seen from the direction perpendicular to a plane tangent to outer peripheral surface 3.

Figure 4:
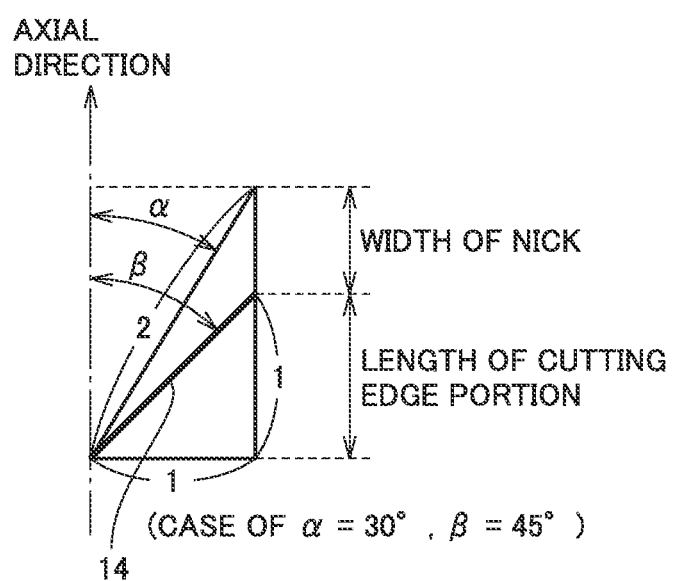
FIG. 4 is a schematic view geometrically showing a configuration of one unit constituted of one cutting edge portion and one nick.

FIG. 4 is a schematic view geometrically showing a configuration of one unit constituted of one cutting edge portion and one nick. As shown in FIG. 4, the inclination angle of cutting edge portion relative to the axial direction is denoted by β, and the inclination angle of diagonal line of rectangle relative to the axial direction is denoted by α. The diagonal line of rectangle corresponds to the above-described straight line connecting first end 15b and second end 15a to each other. If the length of cutting edge portion in the axial direction is 1, the width of nick in the axial direction is tan(90−α)−tan(90−β). If α is 30° and β is 45°, for example, then the width of nick is about 0.73. As seen from the direction perpendicular to a plane tangent to outer peripheral surface 3, in the state where central axis A overlaps first end 15b, the inclination angle of the straight line relative to central axis A being α° and the inclination angle of first cutting edge portion 14b relative to central axis A being β°, the width of first nick 16 in the direction parallel to central axis A may be less than or equal to tan(90−α)−tan(90−β). Accordingly, first cutting edge portion 14b and second cutting edge portion 14a overlap each other in the circumferential direction. In the direction parallel to central axis A, the length of first cutting edge portion 14b is, for example, greater than or equal to 0.1 mm and less than or equal to 5.0 mm. The length of first cutting edge portion 14b, which can vary depending on the tool diameter, may be chosen as appropriate when it is designed.

Cubic boron nitride (CBN) sintered bodies and polycrystalline diamond (PCD) sintered bodies manufactured by an ultrahigh-pressure technique are generally flat disk-shaped materials. In the case of an endmill tool manufactured by brazing such a sintered body to a cylindrical cemented carbide body, the edge region groups often have a shape with relatively small helix angle (for example, with inclination angle α about less than or equal to 20°). Even in such a case, an edge having the shape in the first embodiment enables cutting edge portions to have inclination angle β larger than inclination angle α. Thus, sharp cutting tool 100 can be created.

The material composing cutting tool 100 is a hard material, such as CBN sintered body, polycrystalline diamond sintered body, ceramics, tungsten carbide (cemented carbide), and cermet. The material composing a plurality of edge region groups 1 is preferably but not limited to at least any of a cemented carbide alloy coated with diamond, a polycrystalline sintered diamond, and a cubic boron nitride, for example. Regardless of the type of hard material, a cylindrical material would allow a greater degree of freedom in shape and would enable multiple-thread edge region groups to be provided on the outer periphery of the tool body. An increased number of threads of edge region groups, however, would increase the number of points of actions of cutting. This may disadvantageously cause chattering vibrations due to increase in cutting resistance. Cutting tool 100 in the present embodiment can split swarf into small pieces and reduce the cutting resistance value by dividing each edge region group with a plurality of nicks.

Ideally speaking, each of a plurality of edge region groups 1 is disposed on a spiral lead line having inclination angle α. However, considering that the shape size is not so large, the edge regions constituting each of a plurality of edge region groups 1 may be disposed on a straight line. In order to further reduce the cutting resistance, it is also effective to arrange the edge regions in a convex circular arc or in a curved line in the cutting rake face direction. A plurality of cutting edge portions do not necessarily need to be the same in length in the direction parallel to central axis A. Similarly, a plurality of nicks do not necessarily need to be the same in width in the direction parallel to central axis A. The cutting edge portions just have to be disposed in such a way that nicks do not concentrate in a certain area to prevent insufficient cutting of material. Cutting tool 100 in the present embodiment can be manufactured using, for example, laser machining and 3D printer.

The effects of the cutting tool in the first embodiment will now be described.

According to cutting tool 100 in the first embodiment, inclination angle β of first cutting edge portion 14b relative to central axis A is larger than inclination angle α of straight line SL relative to central axis A, the straight line SL connecting first end 15b to second end 15a on the front end side of second cutting edge portion 14a. Accordingly, first cutting edge portion 14b has a larger rake angle in the case where inclination angle β of first cutting edge portion 14b relative to central axis A is larger than inclination angle α of the straight line relative to central axis A, than in the case where inclination angle β of first cutting edge portion 14b relative to central axis A is the same as inclination angle α of the straight line relative to central axis A. As a result, the cutting resistance of first cutting edge portion 14b can be reduced. Further, the distance between first cutting edge portion 14b and second cutting edge portion 14a in the circumferential direction is smaller in the case where inclination angle β of first cutting edge portion 14b relative to central axis A is larger than inclination angle α of the straight line relative to central axis A, than in the case where inclination angle β of first cutting edge portion 14b relative to central axis A is the same as inclination angle α of the straight line relative to central axis A. Accordingly, at a time of cutting work, intermittent contact of first and second cutting edge portions 14b and 14a with a workpiece can be prevented. As a result, impulsive vibrations, such as chattering vibrations, can be reduced and the life of cutting tool 100 can be prolonged.

Further, according to cutting tool 100 in the first embodiment, a plurality of edge region groups 1 include second edge region group 20 divided by second nicks 26. Second edge region group 20 includes third edge region 20b and fourth edge region 20a that is adjacent to third edge region 20b, with second nick 26 lying therebetween. Third edge region 20b includes third rake face portion 21b and third flank face portion 22b that is continuous with third rake face portion 21b. The ridgeline between third rake face portion 21b and third flank face portion 22b constitutes third cutting edge portion 24b. Fourth edge region 20a includes fourth rake face portion 21a and fourth flank face portion 22a that is continuous with fourth rake face portion 21a. The ridgeline between fourth rake face portion 21a and fourth flank face portion 22a constitutes fourth cutting edge portion 24a. In the circumferential direction of outer peripheral surface 3, first cutting edge portion 14b is disposed so as to overlap second nick 26, and fourth cutting edge portion 24a is disposed so as to overlap first nick 16. Thus, the cutting edge portions can lie in all positions in the axial direction.

Further, according to cutting tool 100 in the first embodiment, as seen from the direction perpendicular to a plane tangent to outer peripheral surface 3, in the state where central axis A overlaps first end 15b, the inclination angle of the straight line relative to central axis A is greater than or equal to 5° and less than or equal to 45°, and the inclination angle of first cutting edge portion 14b relative to central axis A is larger than the inclination angle of the straight line relative to central axis A by greater than or equal to 3° and less than or equal to 15°. Thus, the cutting resistance value can be reduced while prolonging the tool life.

Further, according to cutting tool 100 in the first embodiment, as seen from the direction perpendicular to a plane tangent to outer peripheral surface 3, in the state where central axis A overlaps first end 15b, the inclination angle of the straight line relative to central axis A being α° and the inclination angle of first cutting edge portion 14b relative to central axis A being β°, the width of first nick 16 in the direction parallel to central axis A is less than or equal to $\tan(90-\alpha)-\tan(90-\beta)$. In other words, the length of first cutting edge portion 14b in the direction parallel to central axis A is longer than $\tan(90-\beta)$. Thus, first cutting edge portion 14b and second cutting edge portion 14a can overlap each other in the circumferential direction. Therefore, occurrence of intermittent impulsive vibrations can be prevented.

(Second Embodiment)

A configuration of cutting tool 100 in a second embodiment will now be described. In the following, features different from those of cutting tool 100 in the first embodiment are mainly described, and similar explanation is not repeated.

Figure 5:
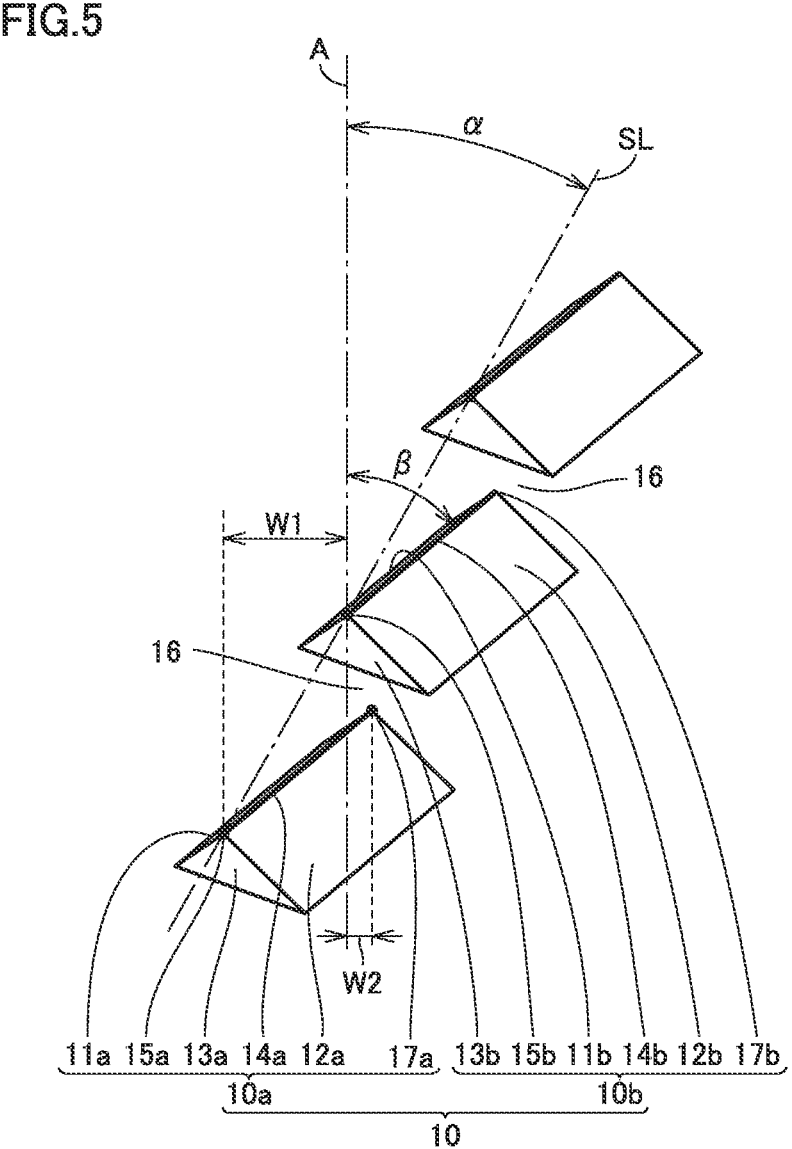
FIG. 5 is a front schematic view showing a configuration of a cutting tool in a second embodiment.

As shown in FIG. 5, first cutting edge portion 14b and second cutting edge portion 14a may overlap each other in the circumferential direction of outer peripheral surface 3. In other words, as seen from the direction perpendicular to a plane tangent to outer peripheral surface 3, first cutting edge portion 14b and second cutting edge portion 14a may be located on the same straight line parallel to central axis A. As seen from the direction perpendicular to a plane tangent to outer peripheral surface 3, the distance W2 between first end 15b and third end 17a in the circumferential direction is, for example, 0.3 times or less the distance W1 between first end 15b and second end 15a in the circumferential direction. Preferably, as seen from the direction perpendicular to a plane tangent to outer peripheral surface 3, the distance W2 between first end 15b and third end 17a in the circumferential direction is 0.05 times or less the distance W1 between first end 15b and second end 15a in the circumferential direction. As shown in FIG. 5, as seen from the direction perpendicular to a plane tangent to outer peripheral surface 3, third end 17a and first bottom face portion 13b may be located on a straight line parallel to central axis A. Cutting tool 100 in the second embodiment has the effects similar to those of cutting tool 100 in the first embodiment. Further, cutting tool 100 in the second embodiment can reduce the cutting resistance.

(Third Embodiment)

A configuration of cutting tool 100 in a third embodiment will now be described. In the following, features different from those of cutting tool 100 in the first embodiment are mainly described, and similar explanation is not repeated.

Figure 6:
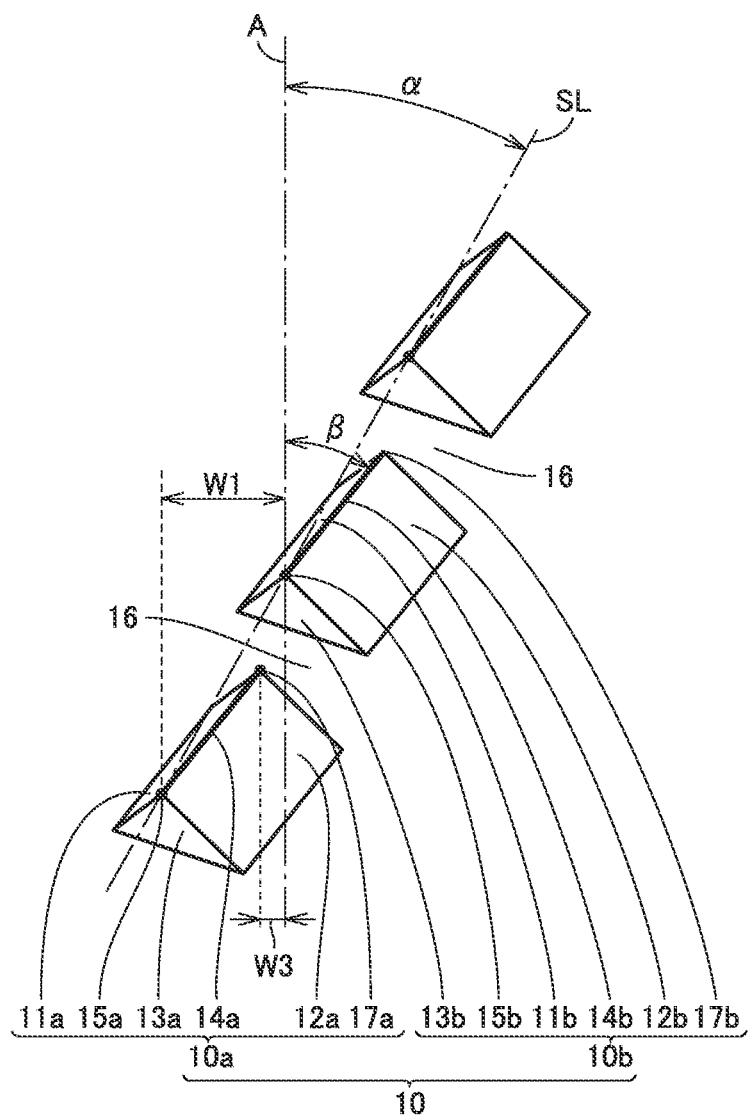
FIG. 6 is a front schematic view showing a configuration of a cutting tool in a third embodiment.

As shown in FIG. 6, first cutting edge portion 14b and second cutting edge portion 14a may be separated from each other in the circumferential direction of outer peripheral surface 3. In other words, as seen from the direction perpendicular to a plane tangent to outer peripheral surface 3, first cutting edge portion 14b and second cutting edge portion 14a may not be located on the same straight line parallel to central axis A. As seen from the direction perpendicular to a plane tangent to outer peripheral surface 3, the distance W3 between first end 15b and third end 17a in the circumferential direction is, for example, 0.1 times or less the distance between first end 15b and second end 15a in the circumferential direction. Preferably, as seen from the direction perpendicular to a plane tangent to outer peripheral surface 3, the distance W3 between first end 15b and third end 17a in the circumferential direction may be 0.05 times or less the distance W1 between first end 15b and second end 15a in the circumferential direction. As seen from the direction perpendicular to a plane tangent to outer peripheral surface 3, third end 17a and first bottom face portion 13b may be located on a straight line parallel to central axis A. Cutting tool 100 in the third embodiment has the effects similar to those of cutting tool 100 in the first embodiment. Further, cutting tool 100 in the third embodiment can reduce changes in cutting resistance.

(Fourth Embodiment)

A configuration of cutting tool 100 in a fourth embodiment will now be described. In the following, features different from those of cutting tool 100 in the first embodiment are mainly described, and similar explanation is not repeated.

Figure 7:
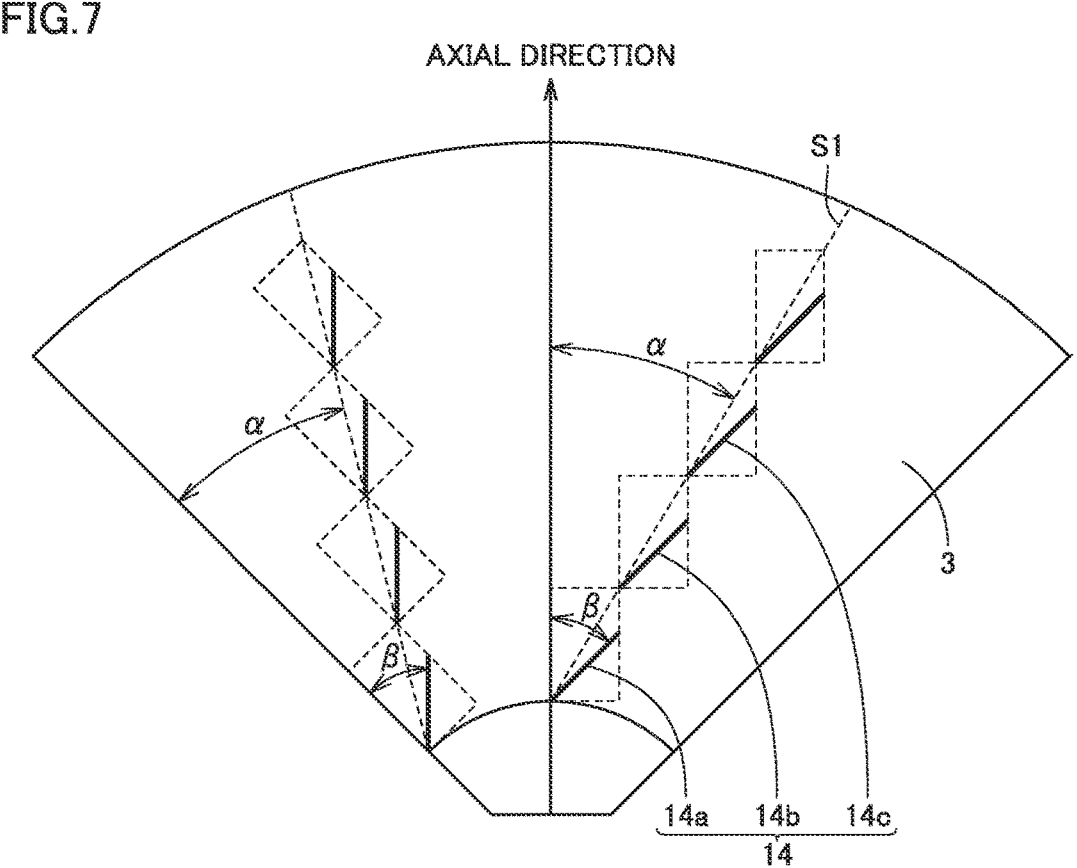
FIG. 7 is a developed schematic view showing a configuration of a cutting tool in a fourth embodiment.

Cutting tool 100 may be, for example, a tapered endmill. In the case where cutting tool 100 is a tapered endmill, shaft portion 2 has a circular truncated cone portion. As shown in FIG. 7, if outer peripheral surface 3 of the circular truncated cone is developed in the circumferential direction, it has a circular sector shape. Each of the ends on the front end side of cutting edge portions 14 is located on first spiral lead line S1. Inclination angle β of cutting edge portions 14 relative to the axial direction is larger than inclination angle α of first spiral lead line S1 relative to the axial direction. Cutting tool 100 in the fourth embodiment has the effects similar to those of cutting tool 100 in the first embodiment.

Cutting tool 100 in each of the above embodiments may be, for example, a radial endmill, a ball endmill, and a T-slot side cutter. Further, cutting tool 100 in each of the above embodiments may be a solid tool in which a rigid body itself forms the main body and the edge region groups, may be a brazed tool typically with CBN and PCD, or may be a throw-away tool with a chip that includes cutting edge portions being detachable by a fastening mechanism such as screws and wedges.

The mechanism by which cutting tool 100 in each of the above embodiments reduces impulsive vibrations while reducing cutting resistance will now be described in detail by comparison with a comparative example.

As shown in FIG. 8, in cutting tool 100 in a comparative example, inclination angle β of cutting edge portions 14 relative to the axial direction is the same as inclination angle α of spiral lead line S1 relative to the axial direction. In this case, in the circumferential direction, cutting edge portions and nicks are alternately disposed. Accordingly, where the vertical axis represents the cutting resistance and the horizontal axis represents the time, a workpiece is hit by the cutting edge portions during a certain period of time, whereas a workpiece is not hit by the cutting edge portions during another period of time. That is, a workpiece is intermittently hit by the cutting edge portions, thus causing great impulsive vibrations, such as chattering vibrations.

As shown in FIG. 9, in cutting tool 100 in the Examples, inclination angle β of cutting edge portions relative to the axial direction is larger than inclination angle α of the cutting edge array direction relative to the axial direction. If the inclination angle of spiral lead line S1 relative to the axial direction is the same as that of the comparative example, inclination angle β of cutting edge portions 14 relative to the axial direction of cutting tool 100 in the Examples is larger than inclination angle β of cutting edge portions 14 relative to the axial direction of cutting tool 100 in the comparative example. That is, cutting tool 100 in the Examples has a larger cutting edge rake angle than cutting tool 100 in the comparative example. Therefore, the cutting resistance can be reduced. Specifically, cutting resistance R2 (see FIG. 9) of cutting tool 100 in the Examples is smaller than cutting resistance R1 (see FIG. 8) of cutting tool 100 in the comparative example. Further, in cutting tool 100 in the Examples, cutting edge portions 14 are continuously disposed in the circumferential direction. Therefore, where the vertical axis represents the cutting resistance and the horizontal axis represents the time, a workpiece is hit by the cutting edge portions in all periods of time. In other words, the cutting edge portions perform cutting continuously in the circumferential direction (direction of rotation). Therefore, intermittent chamfer impacts of cutting edge portions 14 can be reduced. As a result, impulsive vibrations, such as chattering vibrations, can be reduced and the tool life can be prolonged.

EXAMPLE 1

(Preparation of Sample)

Endmills of sample 1A to sample 1D were prepared. In the endmills of sample 1A to sample 1D, first cutting edge portion 14b and second cutting edge portion 14a overlap each other in the circumferential direction (see FIG. 5). Respective widths W1 (see FIG. 5) of the endmills of sample 1A to sample 1D were all 1.0 mm. Respective overlapping widths W2 (see FIG. 5) of the endmills of sample 1A to sample 1D were 0 mm, 0.05 mm, 0.3 mm, and 0.5 mm, respectively. The respective values W2/W1 of the endmills of sample 1A to sample 1D were 0, 0.05, 0.3, and 0.5 respectively. In each of the endmills of sample 1A to sample 1D, inclination angle α and inclination angle β were 25° and 34°, respectively.

(Experimental Conditions)

Cutting tests were performed for workpieces using the endmills of sample 1A to sample 1D. Each of the workpieces was Inconel 718 (registered trademark of Special Metals). The cutting speed (V) was 100 m/min. The diameter of the endmills was 10φ. The number of the edge region groups was 8. The depth of cut (ap) in the axial direction was 5 mm. The depth of cut (ae) in the radial direction was 0.1 mm. The feed rate (f) was 0.03 mm per edge. The cutting tests were dry cutting. The cutting resistance values of the endmills of sample 1A to sample 1D were measured with a Kistler cutting-resistance measuring instrument. The cutting resistance value refers to the maximum of measured values of dynamometer.

(Experimental Results)

TABLE 1

| Sample No. | α (°) | β (°) | W2/W1 | W1 (mm) | W2 (mm) | Cutting Resistance Value (N) |
|---|---|---|---|---|---|---|
| 1A | 25 | 34 | 0 | 1.0 | 0 | 280 |
| 1B | 25 | 34 | 0.05 | 1.0 | 0.05 | 282 |
| 1C | 25 | 34 | 0.3 | 1.0 | 0.3 | 334 |
| 1D | 25 | 34 | 0.5 | 1.0 | 0.5 | 396 |

As shown in Table 1, the cutting resistance values of the endmills of sample 1A to sample 1C were greater than or equal to 280 N and less than or equal to 334 N, whereas the cutting resistance value of the endmill of sample 1D was 396 N. From these results, it was confirmed that setting W2/W1 to less than or equal to 0.3 can remarkably reduce the cutting resistance value. Further, the cutting resistance values of the endmills of sample 1A and sample 1B were greater than or equal to 280 N and less than or equal to 282 N, whereas the cutting resistance value of the endmill of sample 1C was 334 N. From these results, it was confirmed that setting W2/W1 to less than or equal to 0.05 can further reduce the cutting resistance value.

EXAMPLE 2

(Preparation of Sample)

Endmills of sample 2A to sample 2D were prepared. In the endmills of sample 2A to sample 2D, first cutting edge portion 14b and second cutting edge portion 14a were separated from each other in the circumferential direction (see FIG. 6). Respective widths W1 (see FIG. 6) of the endmills of sample 2A to sample 2D were all 1.0 mm. Respective separation widths W3 (see FIG. 6) of the endmills of sample 2A to sample 2D were 0 mm, 0.01 mm, 0.05 mm, and 0.1 mm, respectively. The respective values W3/W1 of the endmills of sample 1A to sample 1D were 0, 0.01, 0.05, and 0.1 respectively. In each of the endmills of sample 2A to sample 2D, inclination angle α and inclination angle β were 25° and 34°, respectively.

(Experimental Conditions)

Cutting tests were performed for workpieces using the endmills of sample 2A to sample 2D. Each of the workpieces was Inconel 718 (registered trademark of Special Metals). The cutting speed (V) was 100 m/min. The diameter of the endmills was 10φ. The number of the edge region groups was 8. The diameter of the endmills was 10φ. The number of the edge region groups was 8. The depth of cut (ap) in the axial direction was 5 mm. The depth of cut (ae) in the radial direction was 0.1 mm. The feed rate (f) was 0.03 mm per edge. The cutting tests were dry cutting. The ranges of fluctuation in cutting resistance value of the endmills of sample 2A to sample 2D were measured with a Kistler cutting-resistance measuring instrument. The range of fluctuation in cutting resistance value refers to the range (amount of change) within which a measured value of dynamometer changes during cutting. A larger interval between cuttings due to nick portions causes a larger difference in impulsive force between a time of cutting and a time of idling, leading to a larger range of fluctuation in cutting resistance value.

(Experimental Results)

TABLE 2

| Sample No. | α (°) | β (°) | W3/W1 | W1 (mm) | W3 (mm) | Range of Fluctuation in Cutting Resistance Value (N) |
|---|---|---|---|---|---|---|
| 2A | 25 | 34 | 0 | 1.0 | 0 | 44 |
| 2B | 25 | 34 | 0.01 | 1.0 | 0.01 | 44 |
| 2C | 25 | 34 | 0.05 | 1.0 | 0.05 | 48 |
| 2D | 25 | 34 | 0.1 | 1.0 | 0.1 | 69 |

As shown in Table 2, the ranges of fluctuation in cutting resistance value of the endmills of sample 2A to sample 2C were greater than or equal to 44 N and less than or equal to 48 N, whereas the cutting resistance value of the endmill of sample 2D was 69 N. From these results, it was confirmed that setting W3/W1 to less than or equal to 0.05 can remarkably reduce the range of fluctuation in cutting resistance value. Further, the cutting resistance values of the endmills of sample 2A and sample 2B were both greater than or equal to 44 N, whereas the cutting resistance value of the endmill of sample 2C was 48 N. From these results, it was confirmed that setting W3/W1 to less than or equal to 0.01 can further reduce the range of fluctuation in cutting resistance value.

EXAMPLE 3

(Preparation of Sample)

Endmills of sample 3A to sample 3E were prepared. In the endmills of sample 3A to sample 3E, inclination angles α were different from each other and inclination angles β were also different from each other (see FIG. 2). Respective inclination angles α of the endmills of sample 3A to sample 3E were 2°, 5°, 25°, 45°, and 60°, respectively. Respective inclination angles β of the endmills of sample 3A to sample 3E were 3°, 8°, 34°, 54°, and 68°, respectively.

(Experimental Conditions)

Cutting tests were performed for workpieces using the endmills of sample 3A to sample 3E. Each of the workpieces was Inconel 718 (registered trademark of Special Metals). The cutting speed (V) was 100 m/min. The diameter of the endmills was 10φ. The number of the edge region groups was 8. The depth of cut (ap) in the axial direction was 5 mm. The depth of cut (ae) in the radial direction was 0.1 mm. The feed rate (f) was 0.03 mm per edge. The cutting tests were dry cutting. The cutting resistance values of the endmills of sample 3A to sample 3E were measured with a Kistler cutting-resistance measuring instrument. Also, the tool lives of the endmills of sample 3A to sample 3E were measured. The tool life refers to the machining time that elapses before a flank abrasion loss VB reaches 0.2 mm.

(Experimental Results)

TABLE 3

| Sample No. | α (°) | β (°) | Cutting Resistance Value (N) | Tool Life (min) |
|---|---|---|---|---|
| 3A | 2 | 3 | 450 | 15 |
| 3B | 5 | 8 | 320 | 27 |
| 3C | 25 | 34 | 280 | 47 |
| 3D | 45 | 54 | 278 | 38 |
| 3E | 60 | 68 | 316 | 22 |

As shown in Table 3, the cutting resistance values of the endmills of sample 3B to sample 3E were greater than or equal to 280 N and less than or equal to 320 N, whereas the cutting resistance value of the endmill of sample 3A was 450

N. From these results, it was confirmed that setting inclination angle α to greater than or equal to 5° can remarkably reduce the cutting resistance value. Further, the tool lives of the endmills of sample 3B to sample 3D were greater than or equal to 27 minutes and less than or equal to 47 minutes, whereas the tool lives of the endmills of sample 3A and sample 3E were greater than or equal to 15 minutes and less than or equal to 22 minutes. From these results, it was confirmed that setting inclination angle α to greater than or equal to 5° and less than or equal to 45° can reduce the cutting resistance value while prolonging the tool life.

EXAMPLE 4

(Preparation of Sample)

Endmills of sample 4A to sample 4C were prepared. In the endmills of sample 4A to sample 4C, inclination angles α were the same but inclination angles β were different from each other (see FIG. 2). Respective inclination angles α of the endmills of sample 4A to sample 4C were all 5°. The respective values obtained by subtracting respective inclination angles α from respective inclination angles β in the endmills of sample 4A to sample 4C were 1°, 3°, and 9°, respectively.

Endmills of sample 5A to sample 5E were prepared. In the endmills of sample 5A to sample 5E, inclination angles α were the same but inclination angles β were different from each other (see FIG. 2). Respective inclination angles α of the endmills of sample 5A to sample 5E were all 25°. The respective values obtained by subtracting respective inclination angles α from respective inclination angles β in the endmills of sample 5A to sample 5E were 1°, 3°, 9°, 15°, and 25°, respectively.

Endmills of sample 6A to sample 6D were prepared. In the endmills of sample 6A to sample 6D, inclination angles α were the same but inclination angles β were different from each other (see FIG. 2). Respective inclination angles α of the endmills of sample 6A to sample 6D were all 45°. The respective values obtained by subtracting respective inclination angles α from respective inclination angles β in the endmills of sample 6A to sample 6D were 1°, 3°, 9°, and 15°, respectively.

(Experimental Conditions)

Cutting tests were performed for workpieces using the endmills of sample 4A to sample 4C, the endmills of sample 5A to sample 5E, and the endmills of sample 6A to sample 6D. Each of the workpieces was Inconel 718 (registered trademark of Special Metals). The cutting speed (V) was 100 m/min. The diameter of the endmills was 10φ. The number of the edge region groups was 8. The depth of cut (ap) in the axial direction was 5 mm. The depth of cut (ae) in the radial direction was 0.1 mm. The feed rate (f) was 0.03 mm per edge. The cutting tests were dry cutting. The cutting resistance values of the endmills of sample 4A to sample 4C, the endmills of sample 5A to sample 5E, and the endmills of sample 6A to sample 6D were measured with a Kistler cutting-resistance measuring instrument. Also, the tool lives of the endmills of sample 4A to sample 4C, the endmills of sample 5A to sample 5E, and the endmills of sample 6A to sample 6D were measured. The tool life refers to the machining time that elapses before a flank abrasion loss VB reaches 0.2 mm.

(Experimental Results)

TABLE 4

| Sample No. | α (°) | β−α (°) | Cutting Resistance Value (N) | Tool Life (min) |
|---|---|---|---|---|
| 4A | 5 | 1 | 374 | 25 |
| 4B | 5 | 3 | 320 | 27 |
| 4C | 5 | 9 | 302 | 24 |

As shown in Table 4, the cutting resistance values of the endmills of sample 4B and sample 4C were greater than or equal to 302 N and less than or equal to 320 N, whereas the cutting resistance value of the endmill of sample 4A was 374 N. From these results, it was confirmed that, in the case of inclination angle α of 5°, setting the value of (β−α) to greater than or equal to 3° can remarkably reduce the cutting resistance value. Further, the tool lives of the endmills of sample 4A to sample 4C were greater than or equal to 24 minutes and less than or equal to 27 minutes. From these results, in the case of inclination angle α of 5°, setting the value of (β−α) to less than or equal to 10° can prevent the nick portion gap from being greater than or equal to the cutting edge length. If the nick portion gap is greater than or equal to the cutting edge length, only a smaller number of cutting edges can contribute to cutting, causing reduction in tool life. From these results, it was confirmed that the value of (β−α) being too large weakens the effects.

TABLE 5

| Sample No. | α (°) | β−α (°) | Cutting Resistance Value (N) | Tool Life (min) |
|---|---|---|---|---|
| 5A | 25 | 1 | 310 | 30 |
| 5B | 25 | 3 | 251 | 37 |
| 5C | 25 | 9 | 280 | 47 |
| 5D | 25 | 15 | 130 | 41 |
| 5E | 25 | 25 | 122 | 27 |

As shown in Table 5, the cutting resistance values of the endmills of sample 5B to sample 5E were greater than or equal to 122 N and less than or equal to 280 N, whereas the cutting resistance value of the endmill of sample 5A was 310 N. From these results, it was confirmed that, in the case of inclination angle α of 25°, setting the value of (β−α) to greater than or equal to 3° can remarkably reduce the cutting resistance value. Further, the tool lives of the endmills of sample 5A to sample 5D were greater than or equal to 30 minutes and less than or equal to 47 minutes, whereas tool life of the endmill of sample 5E was 27 minutes. From these results, it was confirmed that, in the case of inclination angle α of 25°, setting the value of (β−α) to greater than or equal to 3° and less than or equal to 15° can reduce the cutting resistance value while prolonging the tool life.

TABLE 6

| Sample No. | α (°) | β−α (°) | Cutting Resistance value (N) | Tool Life (min) |
|---|---|---|---|---|
| 6A | 45 | 1 | 292 | 31 |
| 6B | 45 | 3 | 263 | 33 |
| 6C | 45 | 9 | 278 | 38 |
| 6D | 45 | 15 | 170 | 15 |

As shown in Table 6, the cutting resistance values of the endmills of sample 6B to sample 6D were greater than or equal to 120 N and less than or equal to 278 N, whereas the cutting resistance value of the endmill of sample 6A was 292 N. From these results, it was confirmed that, in the case of inclination angle α of 45°, setting the value of (β−α) to greater than or equal to 3° can remarkably reduce the cutting resistance value. Further, the tool lives of the endmills of sample 6A to sample 6D were greater than or equal to 15 minutes and less than or equal to 38 minutes. From these results, it was confirmed that, in the case of inclination angle α of 45°, setting the value of (β−α) to greater than or equal to 3° and less than or equal to 15° can reduce the cutting resistance value.

Putting the results in Table 4 to Table 6 together, it was confirmed that preferable inclination angle α is greater than or equal to 5° and less than or equal to 45° and that inclination angle being larger than inclination angle α by greater than or equal to 3° can reduce the cutting resistance value while prolonging the tool life. Note, however, that it should be a possible angle based on inclination angle α and that the size of nick gap should not be greater than or equal to half (0.5 times) the height of cutting edge in the height direction. To sum up, setting the value of (β−α) to greater than or equal to 3° and less than or equal to 15° can bring about the effects.

It should be construed that the embodiments disclosed herein are given by way of example in all respects, not by way of limitation. It is intended that the scope of the present invention is defined by the claims, not by the above-described embodiments, and encompasses all modifications equivalent in meaning and scope to the claims.

REFERENCE SIGNS LIST

1: edge region group; 10a: second edge region; 10b: first edge region; 2: shaft portion; 3: outer peripheral surface; 4: front end; 10: first edge region group; 11a: second rake face portion; 11b: first rake face portion; 12a: second flank face portion; 12b: first flank face portion; 13a: second bottom face portion; 13b: first bottom face portion; 14: cutting edge portion; 14a: second cutting edge portion; 14b: first cutting edge portion; 14c: fifth cutting edge portion; 15a: second end; 15b: first end; 16: first nick; 17a: third end; 17b: fourth end; 20: second edge region group; 20a: fourth edge region; 20b: third edge region; 21a: fourth rake face portion; 21b: third rake face portion; 22a: fourth flank face portion; 22b: third flank face portion; 23a: fourth bottom face portion; 23b: third bottom face portion; 24a: fourth cutting edge portion; 24b: third cutting edge portion; 26: second nick; 100: cutting tool; A: central axis; S1: first spiral lead line (spiral lead line); S2: second spiral lead line; SL: straight line

The invention claimed is:

1. A cutting tool comprising:
a shaft portion extending along a central axis and including an outer peripheral surface surrounding the central axis; and
a plurality of edge region groups spirally provided on the outer peripheral surface,
the plurality of edge region groups including a first edge region group divided by a first nick,
the first edge region group including a first edge region and a second edge region that is adjacent to the first edge region, with the first nick lying between the first edge region and the second edge region,
the first edge region including a first rake face portion and a first flank face portion that is continuous with the first rake face portion, a ridgeline between the first rake face portion and the first flank face portion constituting a first cutting edge portion,
the second edge region including a second rake face portion and a second flank face portion that is continuous with the second rake face portion, a ridgeline between the second rake face portion and the second flank face portion constituting a second cutting edge portion,
as seen from a direction perpendicular to a plane tangent to the outer peripheral surface, in a state where the central axis overlaps a first end on a front end side of the first cutting edge portion, an inclination angle of the first cutting edge portion relative to the central axis being larger than an inclination angle of a straight line relative to the central axis, the straight line connecting the first end to a second end on a front end side of the second cutting edge portion,
the plurality of edge region groups including a second edge region group divided by a second nick,
the second edge region group including a third edge region and a fourth edge region that is adjacent to the third edge region, with the second nick lying between the third edge region and the fourth edge region,
the third edge region including a third rake face portion and a third flank face portion that is continuous with the third rake face portion, a ridgeline between the third rake face portion and the third flank face portion constituting a third cutting edge portion,
the fourth edge region including a fourth rake face portion and a fourth flank face portion that is continuous with the fourth rake face portion, a ridgeline between the fourth rake face portion and the fourth flank face portion constituting a fourth cutting edge portion,
in a circumferential direction of the outer peripheral surface, the first cutting edge portion being disposed so as to overlap the second nick, and the fourth cutting edge portion being disposed so as to overlap the first nick,
the second cutting edge portion including a third end on a side opposite to the second end,
the first cutting edge portion and the second cutting edge portion overlapping each other in a circumferential direction of the outer peripheral surface,
as seen from the direction perpendicular to a plane tangent to the outer peripheral surface, a distance between the first end and the third end in the circumferential direction being 0.3 times or less a distance between the first end and the second end in the circumferential direction,
the plurality of edge region groups being composed of at least any of a polycrystalline sintered diamond and a cubic boron nitride.

2. The cutting tool according to claim 1, wherein as seen from the direction perpendicular to a plane tangent to the outer peripheral surface, the distance between the first end and the third end in the circumferential direction is 0.05 times or less the distance between the first end and the second end in the circumferential direction.

3. The cutting tool according to claim 1, wherein the second cutting edge portion includes a third end on a side opposite to the second end,
the first cutting edge portion and the second cutting edge portion are separated from each other in the circumferential direction of the outer peripheral surface, and
as seen from the direction perpendicular to a plane tangent to the outer peripheral surface, the distance between the first end and the third end in the circumferential direction is 0.1 times or less the distance between the first end and the second end in the circumferential direction.

4. The cutting tool according to claim 3, wherein, as seen from the direction perpendicular to a plane tangent to the outer peripheral surface, the distance between the first end and the third end in the circumferential direction is 0.05 times or less the distance between the first end and the second end in the circumferential direction.

5. The cutting tool according to claim 1, wherein, as seen from the direction perpendicular to a plane tangent to the outer peripheral surface, in the state where the central axis overlaps the first end, the inclination angle of the straight line relative to the central axis is greater than or equal to 5° and less than or equal to 45°, and the inclination angle of the first cutting edge portion relative to the central axis is larger than the inclination angle of the straight line relative to the central axis by greater than or equal to 3° and less than or equal to 15°.

6. The cutting tool according to claim 1, wherein, as seen from the direction perpendicular to a plane tangent to the outer peripheral surface, in the state where the central axis overlaps the first end, the inclination angle of the straight line relative to the central axis being $\alpha°$ and the inclination angle of the first cutting edge portion relative to the central axis being $\beta°$, a width of the first nick in a direction parallel to the central axis is less than or equal to $\tan(90-\alpha)-\tan(90-\beta)$.

* * * * *